US011782695B2

(12) United States Patent
Verma et al.

(10) Patent No.: US 11,782,695 B2
(45) Date of Patent: Oct. 10, 2023

(54) DYNAMIC RING STRUCTURE FOR DEPLOYMENT POLICIES FOR IMPROVED RELIABILITY OF CLOUD SERVICE

(71) Applicant: Microsoft Technology Licensing, LLC, Redmond, WA (US)

(72) Inventors: Nidhi Verma, Redmond, WA (US);
Rahul Nigam, Bothell, WA (US);
Rohan Khanna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/536,830

(22) Filed: Nov. 29, 2021

(65) Prior Publication Data

US 2023/0168880 A1 Jun. 1, 2023

(51) Int. Cl.
*G06F 9/445* (2018.01)
*G06F 8/65* (2018.01)
*G06N 20/00* (2019.01)
*G06F 11/36* (2006.01)
*H04L 67/00* (2022.01)

(52) U.S. Cl.
CPC ............ *G06F 8/65* (2013.01); *G06F 11/3612* (2013.01); *G06N 20/00* (2019.01); *H04L 67/34* (2013.01)

(58) Field of Classification Search
CPC ....................................................... G06F 8/65
USPC ............................................................ 717/172
See application file for complete search history.

(56) References Cited

U.S. PATENT DOCUMENTS

| 8,978,012 | B1 * | 3/2015 | Poole .................. G06F 11/0748 |
| | | | 717/124 |
| 9,454,465 | B1 * | 9/2016 | Jhoney ................ G06F 11/3692 |
| 10,747,520 | B2 | 8/2020 | Shepard et al. |
| 10,871,954 | B2 | 12/2020 | Choudhari et al. |
| 11,240,181 | B1 * | 2/2022 | Nagaraja ................. H04L 51/02 |
| 11,269,748 | B2 * | 3/2022 | Chen ..................... H04L 41/40 |
| 11,372,634 | B1 * | 6/2022 | Gabrielson ......... H04L 67/1031 |

(Continued)

OTHER PUBLICATIONS

"Dynamics 365 for Finance and Operations—Cloud Application Lifecycle", Retrieved from: https://info.microsoft.com/rs/157-GQE-382/images/D365-for-Finance-and-Operations-Cloud-Application-Lifecycle.pdf, May 2019, pp. 1-6.

(Continued)

*Primary Examiner* — Evral E Bodden
(74) *Attorney, Agent, or Firm* — NovoTechIP International PLLC

(57) ABSTRACT

A data processing system implements obtaining a set of first input parameters associated with a first update to be deployed to one or more components of a cloud-based service; providing the set of first input parameters to a machine learning model to obtain a first deployment policy for the first update; analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to a subset of the userbase of the cloud-based service associated with that ring; and executing the first deployment policy to deploy the update to the one or more components.

20 Claims, 9 Drawing Sheets

(56) References Cited

U.S. PATENT DOCUMENTS

| | | | |
|---|---|---|---|
| 2019/0156246 A1* | 5/2019 | Kuo | .................... G06K 9/6256 |
| 2019/0196805 A1 | 6/2019 | Lee et al. | |
| 2020/0241868 A1 | 7/2020 | Murthy et al. | |
| 2020/0326919 A1 | 10/2020 | Kaler et al. | |
| 2020/0341754 A1 | 10/2020 | Kunjuramanpillai et al. | |
| 2021/0132927 A1* | 5/2021 | Dinh | ........................ G06F 8/60 |

OTHER PUBLICATIONS

Jacobs et al., "Safe Deployment Practices", Retrieved from; https://docs.microsoft.com/en-us/devops/operate/safe-deployment-practices#ring-based-deployment, May 15, 2021.

Russinovich, Mark, "Advancing Safe Deployment Practices", Retrieved from: https://azure.microsoft.com/en-in/blog/advancing-safe-deployment-practices/, Feb. 5, 2020.

Xia et al., "Safe Velocity: A Practical Guide to Software Deployment at Scale using Controlled Rollout", In Proceedings of IEEE/ACM 41st International Conference on Software Engineering: Software Engineering in Practice, May 29, 2019, 10 Pages.

"International Search Report and Written Opinion Issued in PCT Patent Application No. PCT/US22/043727", dated Dec. 21, 2022, 11 Pages.

\* cited by examiner

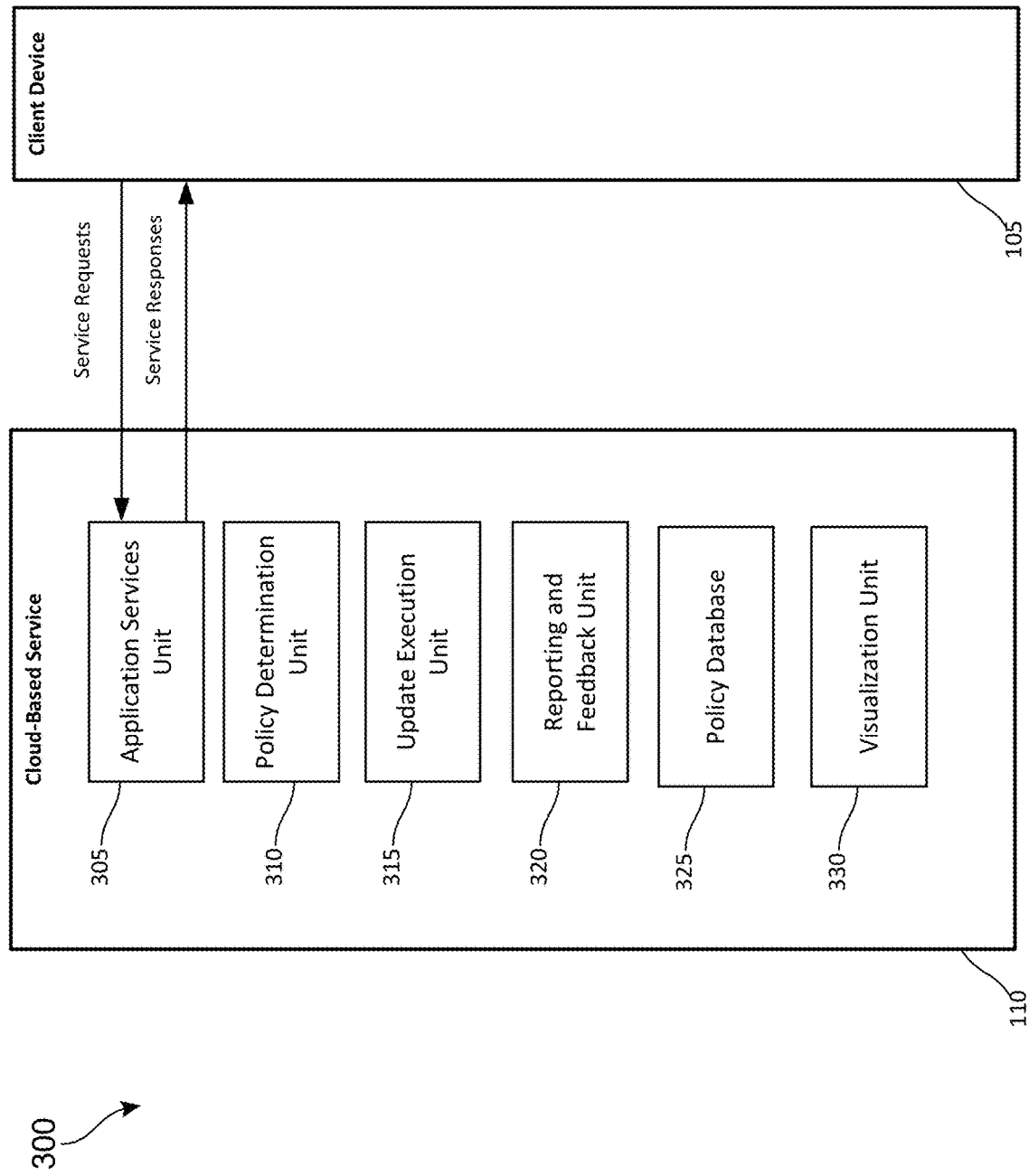

DYNAMIC RING STRUCTURE FOR DEPLOYMENT POLICIES FOR IMPROVED RELIABILITY OF CLOUD SERVICE

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, to roll out fixes to software and/or configuration. Furthermore, some services may support software installed on the client devices, and this software may also need to be updated to a newer version to support added features and/or to fix problems associated with a current version of the software.

Updates are typically rolled out in multiple stages to different groups of users to mitigate the risk of deploying the new version of the software and/or configuration data. This approach is referred to as ring deployment. The deployment process is represented by an expanding series of rings, where each ring includes deploying the update to a larger subset of the userbase being provided access to the update. The underlying hardware and software that support the subset of the userbase associated with the ring is updated. User feedback and telemetry data may be collected from users associated with each ring to determine whether the new version of the software is operating correctly before deploying the updates to the next ring. This process may continue until the update are deployed across the entire userbase.

Rolling out such changes can across the various systems of a cloud-based service in stages if often not a straightforward process. The subsystems of the cloud-based service may have different deployment configurations that define how changes are deployed across these subsystems. The rings for deploying the updates across one subsystem may not completely align with the rings for deploying updates across another system of the cloud-service. Consequently, rolling out updates that impact more than one subsystem of the cloud-service may be a time consuming and manual process for deploying updates. Hence, there is a need for improved systems and methods for deploying updates to cloud services.

SUMMARY

An example data processing system according to the disclosure may include a processor and a machine-readable medium storing executable instructions. The instructions when executed cause the processor to perform operations including obtaining a set of first input parameters associated with a first update to be deployed to one or more components of a cloud-based service; providing the set of first input parameters to a machine learning model to obtain a first deployment policy for the first update; analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to each ring, each ring representing a deployment stage in which the update is deployed to a subset of the userbase of the cloud-based service; and executing the first deployment policy to deploy the update to the one or more components of the cloud-based service.

An example method implemented in a data processing system for deploying updates to a cloud-based service includes obtaining a set of first input parameters associated with a first update to be deployed to one or more components of the cloud-based service; providing the set of first input parameters to a machine learning model to obtain a first deployment policy for the first update; analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to each ring, each ring representing a deployment stage in which the update is deployed to a subset of the userbase of the cloud-based service; and executing the first deployment policy to deploy the update to the one or more components of the cloud-based service.

An example machine-readable medium on which are stored instructions. The instructions when executed cause a processor of a programmable device to perform operations of obtaining a set of first input parameters associated with a first update to be deployed to one or more components of a cloud-based service; providing the set of first input parameters to a machine learning model to obtain a first deployment policy for the first update; analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to each ring, each ring representing a deployment stage in which the update is deployed to a subset of the userbase of the cloud-based service; and executing the first deployment policy to deploy the update to the one or more components of the cloud-based service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is an example architecture that may be used, at least in part, to implement the cloud-based service shown in FIG. 1.

DETAILED DESCRIPTION

Figure 1:
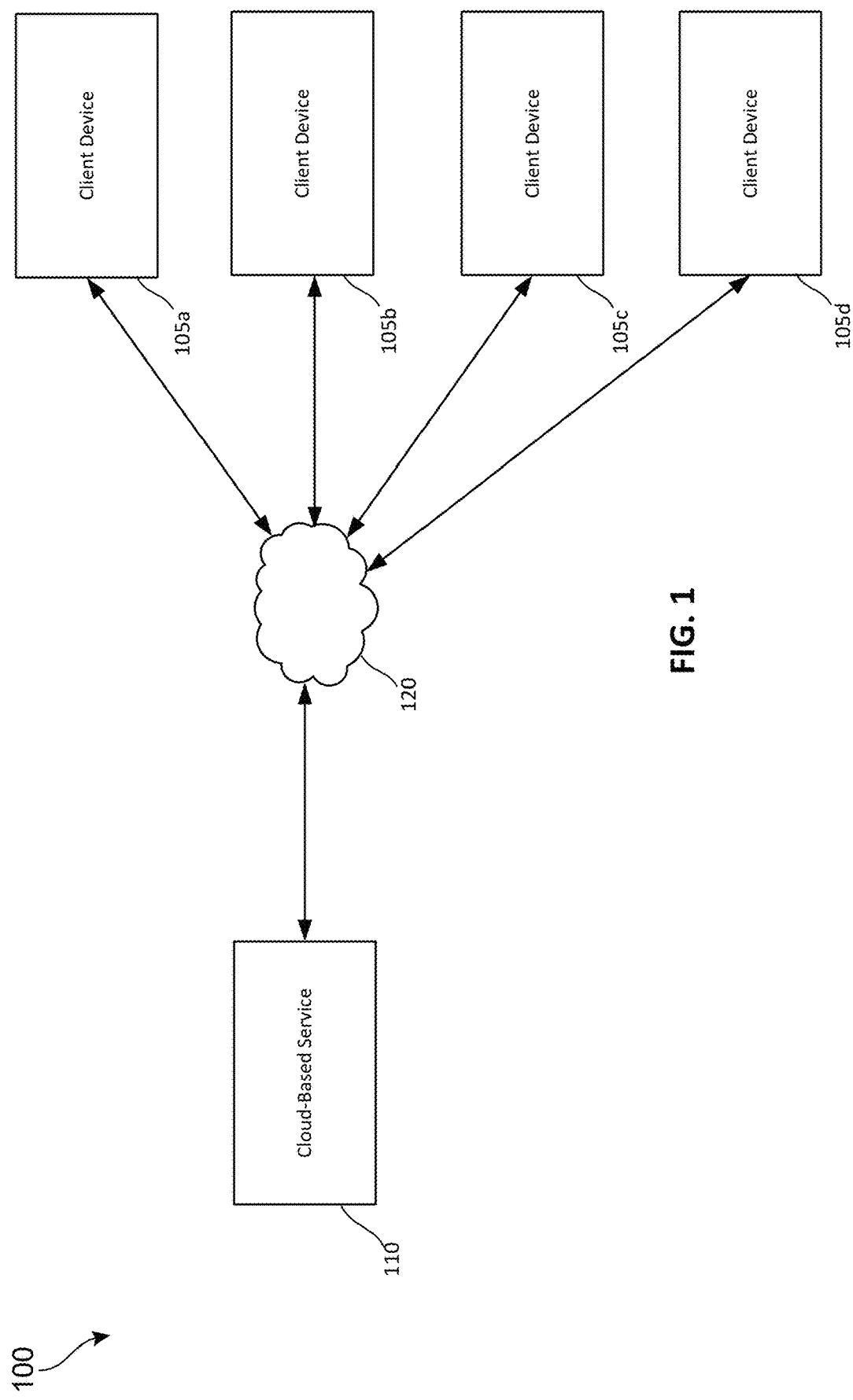
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for generating deployment policies for improved reliability of cloud-based services are provided. These techniques include generating centralized deployment policies that use deployment rings that are consistent across the various subsystems of the cloud-based services. Current approaches for deploying software updates often require manual intervention by an administrator because the various subsystems of the cloud-based services implement independent, and often inconsistent, policies for deploying updates to those components. The improved deployment policy techniques herein provide a technical solution to this problem by deploying updates in a consistent, secure, and reliable manner across the various subsystems of the cloud-based service.

The techniques provided herein simplify the deployment process for update to the cloud-based service by automatically generating a deployment policy based on a set of input parameters that describe the updates to be deployed and the architecture of the cloud-based service. The deployment parameters may include information identifying which elements of the cloud-based service are to be updated, a risk associated with the updated, the audience or scope of the update, a type of update to be performed, and/or other information associated with the update. The deployment parameters are analyzed to determine the scope of the update and to determine the rings associated with each stage of the deployment. A user interface is provided to enable an administrator to define these input parameters. The input parameters are analyzed by a machine learning model trained to analyze the input parameters and to output a deployment policy for the update. The deployment policy defines the deployment process as a sequence of rings that each include an increasingly larger subset of the userbase of the cloud-based service to which the update is to be deployed and an indication when the update should be deployed to that ring.

The deployment policy may be automatically executed to deploy the update across the cloud-based services according to the deployment policy generated for the update. Telemetry data and user feedback may be collected and analyzed at each stage of the deployment to ensure that the updates are operating as intended. The deployment of an update that is not operating as intended may automatically be halted, while those that are operating as intended may automatically be deployed to the entire user based according to the deployment policy. The performance of the models used to generate the deployment policies may be modified based on user input to further optimize the deployment process. A technical benefit of this deployment is a significantly improved the user experience for users of the cloud-based service by ensuring that updates improve the functionality and stability of the cloud-based service. These and other technical benefits of the techniques disclosed herein will be evident from the discussion of the example implementations that follow.

FIG. 1 is a diagram showing an example computing environment 100 in which the techniques for generating deployment policies for improved reliability of cloud-based services are provided may be implemented. The computing environment 100 may include a cloud-based service 110 that implements the techniques for generating and executing centralized deployment policies described herein. The example computing environment 100 may also include one or more client devices, such as the client devices 105a, 105b, 105c, and 105d. The client devices 105a, 105b, 105c, and 105d may communicate with the cloud-based service 110 via the network 120. The network 120 may be a dedicated private network and/or the combination of public and private networks commonly referred to as the Internet.

In the example shown in FIG. 1, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, that are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. Other architectures are also possible, and the deployment policy generated for deploying an update to the cloud-based service 110 accounts for the specific architecture and configuration of the components thereof. Furthermore, the cloud-based service 110 may also include other hardware and software to support various processes and services that support and maintain the various components of the cloud-based service 110. The generation and execution of the deployment policy are discussed in detail in the examples which follow.

In some implementations, the deployment policy generation and execution functionality described as being implemented by the cloud-based service 110 may instead be implemented as a separate service (not shown in FIG. 1) that is configured to handle the deployment policy generation and execution for the cloud-based service 110 and/or other such services. In such an implementation, the deployment policy and generation and execute functionality may be offered as another cloud-based service.

The client devices 105a, 105b, 105c, and 105d (referred to collectively as client device 105) are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices that may utilize the cloud-based service 110. Furthermore, in some implementations, some features of the services provided by the cloud-based service 110 may be implemented by a native application installed on the client device 105, and the native application may communicate with the cloud-based service 110 over a network connection to exchange data with the cloud-based service 110 and/or to access features implemented on the cloud-based service 110.

Figure 2A:
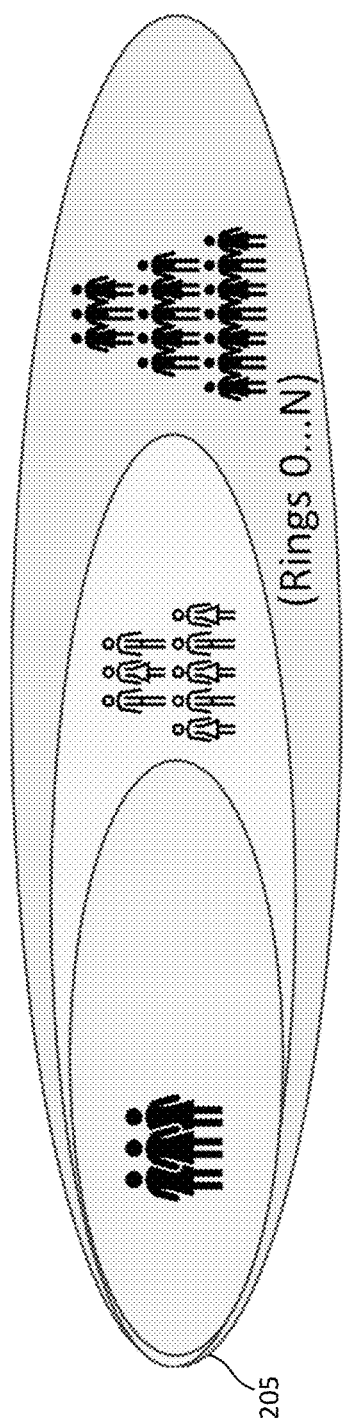
FIGS. 2A and 2B are diagrams showing an example ring configuration for deploying updates on a cloud-based service architecture.

FIG. 2A is a diagram showing a representation of a ring configuration 205 for deploying updates on a cloud-based architecture, such as that of the cloud-based service 110 shown in FIG. 1. Each ring may be associated with a predetermined number of users of the services provided by the cloud-based service 110. The number of users associated with each subsequent ring may be increased until the entire userbase has access to the updates that are being deployed. The number of rings associated with a particular deployment may depend upon the specific update to be deployed, the architecture of the cloud-based service 110, the risk associated with the specific update, and/or other factors that will be discussed in detail in the example which follow. The cloud-based service 110 may be configured to receive telemetry data associated with the updated software and/or user feedback data indicative of the performance of the updates as the updates are deployed to each ring. The cloud-based service 110 may be configured to halt further deployment of the updates in response to the telemetry data and/or the user feedback data indicated that the updates are not operating as expected. The cloud-based service 110 may be configured to expand the rollout to the next ring in response to the telemetry data and/or user feedback indicating that the updates appear to be operating correctly.

Each ring may include a subset of servers and/or other components onto which the updates are deployed to provide the selected subset of users associated with each ring that are provided the updates. Furthermore, the rings earlier in the sequence of rings may include users that are specially selected for initial testing of the updates. For example, users associated with a company or other organization that provides the cloud-based service 110, and employees or other users associated with the company or organization may be included in the original ring or the earlier rings in the sequence.

Figure 2B:
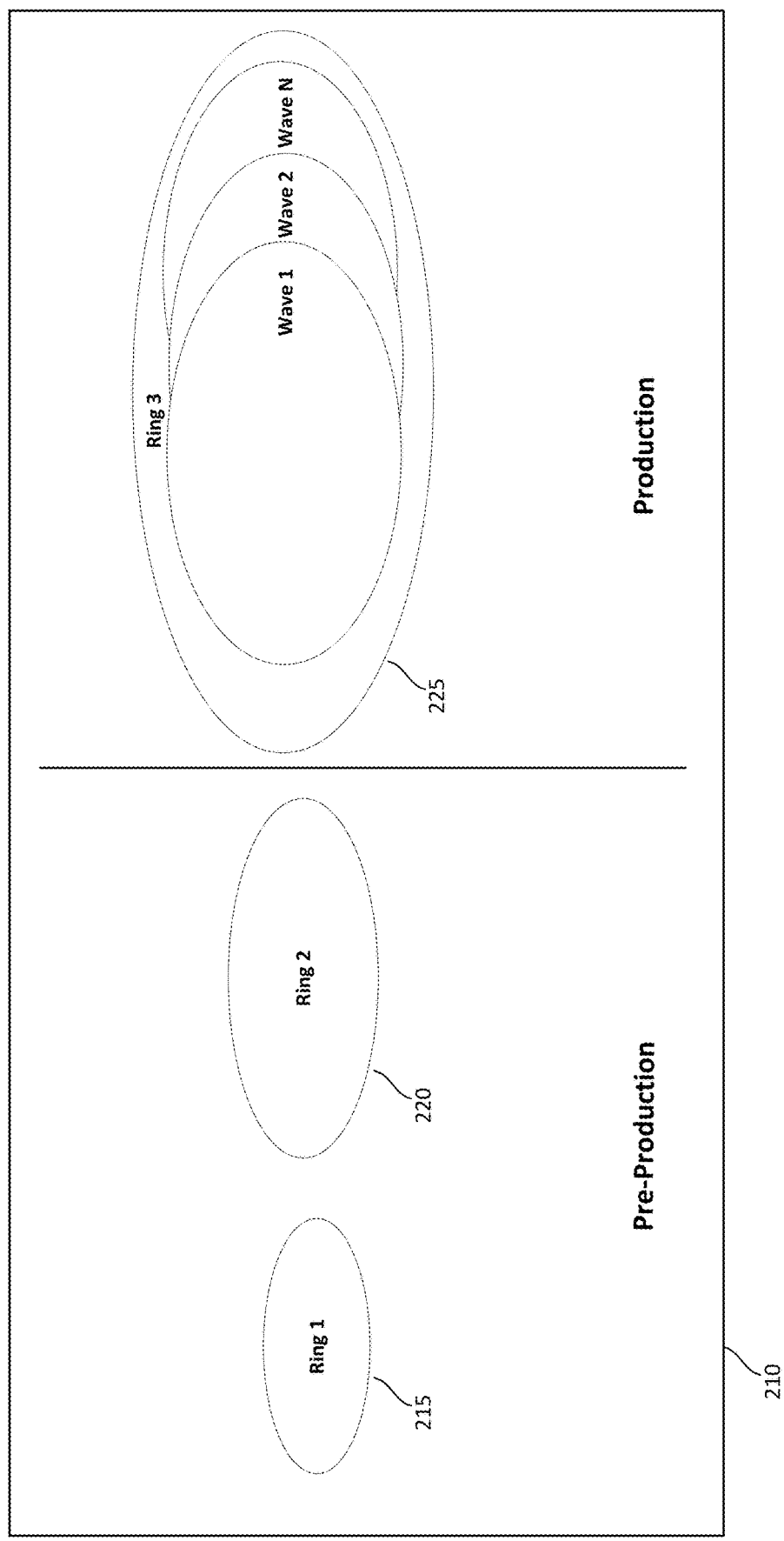

FIG. 2B is a diagram showing a representation of another example ring configuration 210 for deploying updates on a cloud-based architecture, such as that of the cloud-based service 110 shown in FIG. 1. The ring configuration 210 includes three rings 215, 220, and 225. In this example configuration, the first ring 215 and the second ring 220 are associated with users in the pre-production environments in which the updates may be tested by users before deploying the updates to a production environment in which users who are customers of the organization are provided access to the updates. In this example, the first ring 215 is associated with first internal group of users associated with the organization. These users may include members of the development team, testing team, and/or others who have been selected as a first set of users to receive and utilize the update. The computing devices of the users and/or components of the cloud-based service 110 may provide telemetry data. The users themselves may be prompted to provide by the cloud-based service 110 to provide feedback on the update. This telemetry data and/or the user feedback may be analyzed to determine whether the updates are operating as expected. The cloud-based service 110 may halt the deployment to the subsequent rings of the ring configuration 210 in response to determining that the updates are not operating as expected. Otherwise, the deployment process may continue with deploying the updates to the second ring 220.

In the example shown in FIG. 2B, the updates are rolled out to additional users within the preproduction environment. In this example, the organization has many employees who are also users of the services provided by the cloud-based service 110. For example, the first ring 215 in this example includes approximately 20,000 users and the second ring 220 in this example includes approximately 100,000 users associated with the organization. The preproduction environment in this example may be implemented on a separate server and/or sets of servers than the production environment, and the updates may initially be deployed to the server or servers associated with the preproduction environment. In other implementations, the same server or set of servers may provide services to both the preproduction and production environments, and users are directed to the appropriate version of the software based on the group with which the users are associated. Telemetry and user data may be collected from the users associated with the second ring 220, and the cloud-based service 110 may halt the deployment to the subsequent rings of the ring configuration 210 in response to determining that the updates are not operating as expected. Otherwise, the deployment process may continue with deploying the updates to the third ring 225.

The third ring 225 includes users that are using a production version of the software. Thus, the third ring 225 includes users that are outside of organization and are customers who subscribe to the services provided by the cloud-based service 110. The third ring 225 may include a very large number of users. In this example, the third ring 225 may include millions or even billions of users. Thus, the third ring 225 may be further subdivided into waves, and each wave includes a subset of the users that make up the third ring 225. These waves may be used to gradually roll out the updates out to full userbase and to provide another opportunity to collect and analyze telemetry data and/or user feedback from a broader userbase before deploying the updates to all users.

The waves may be selected in different ways. In some implementations, users may be subdivided randomly into several waves to reduce the number of users from the third ring 225 for whom the updates are being deployed at one time. In other implementations, the waves may be based on a priority associated with the user. For example, some users may be provided with early release of new features and updates. In such an implementation, users having a first priority may be associated with the first wave, users having a second priority may be associated with the second wave, and users having a third priority may be associated with the third wave. In this example, only the third ring 225 was subdivided into a set of waves. However, more than one ring may be subdivided in this manner depending upon the size of the userbase, complexity, and risk associated with the deployment. Furthermore, whereas this example shows three rings, other implementations may utilize a different number of rings based on the size of the userbase, complexity, and risk associated with the deployment.

More complex and/or risky updates may be deployed at a slower rate to fewer users for each ring or wave. The code tends to become much more stable as the code is deployed to each of the rings. If a problem occurs, however, the rollout is halted, and a fix may be deployed to those components of the cloud-based service 110 and/or the client device 105 to which the updates were deployed. This approach ensures that changes are rolled out gradually to the userbase, and are tested and stabilized before being deployed across the full userbase.

FIG. 3 is an example architecture 300 that may be used, at least in part, to implement the cloud-based service 110. The cloud-based service 110 may include an application service unit 305, a policy determination unit 310, an update execution unit 315, a reporting and feedback unit 320, a policy database 325, and a visualization unit 330.

The application service unit 305 may be configured to provide the various services offered to customers of the cloud-based service 110. The application service unit 305 may be configured to receive service requests from the client devices 105 of users and to provide service responses to the client devices 105 of the users. The specific types of services provided by the cloud-based service 110 may vary. These services may include but are not limited to providing applications for creating, consuming, and/or modifying content, file storage and management platforms, collaboration and communications platforms, and other types of software as a service.

The policy determination unit 310, the update execution unit 315, the reporting and feedback unit 320, and the policy database 325 are configured to provide the policy generation and execution functionality provided herein. In the example shown in FIG. 3, the policy generation and execution functionality are implemented on the cloud-based service 110 for which these functions are being performed. In other implementations, the deployment policy generation and execution functionality may be provided, at least in part, by separate service.

The policy determination unit 310 is configured to generate deployment policies that may be executed to deploy an update. Such an update may refer to an update to software and/or configuration data to provide or enable one or more new features. An update may also refer to software and/or configuration data that provides a fix for a problem occurring in one or more elements of the services provided by the cloud-based service 110. A payload may include multiple new features and/or fixes for problems.

The policy determination unit 310 provides a centralized source for deployment policies across all the elements of the cloud-based service 110. This ensures that the updates are deployed consistently across the cloud-based service 110 regardless of the specific payload to be deployed in the update. The policy determination unit 310 may be configured to generate deployment policies based on predetermined ring definitions and/or based on dynamically generated ring definitions determined based at least in part on the architecture of the cloud-based service 110. The dynamically generated ring definitions may be based at least in part on the predetermined ring definitions. The dynamically generated ring definitions may be generated using a machine learning model trained to analyze input parameters associated with an update to be deployed and to generate a deployment policy for the update based on the provided parameters. In yet other implementations, the machine learning model may be configured to select a set of ring definitions from sets of predetermined ring definitions when generating the deployment policy. The input parameters and the generation of the deployment policy are discussed in greater detail in the example implementation shown in FIG. 4.

The update execution unit 315 is configured to execute the deployment policies generated by the policy determination unit 310. The execution of the deployment policies created by the policy determination unit 310 is discussed in greater detail with respect to FIG. 4

The reporting and feedback unit 320 is configured to receive telemetry data from components of the cloud-based service 110 and/or client devices 105 of users. The reporting and feedback unit 320 may be configured to analyze the telemetry data and/or user feedback received, to generate reports that show the performance of the updated based on the analyzed data, and to automatically perform various actions in response to determining that the updates are not performing as desired. Additional details of the operations that may be performed by the reporting and feedback unit 320 are discussed with respect to FIG. 4.

The policy database 325 may be a database configured to store deployment policies generated by the policy determination unit 310 and data associated with the execution of the deployment policy. The policy database 325 record for a deployment policy may include the location and/or file names of the payload to be deployed as the updates.

Figure 4:
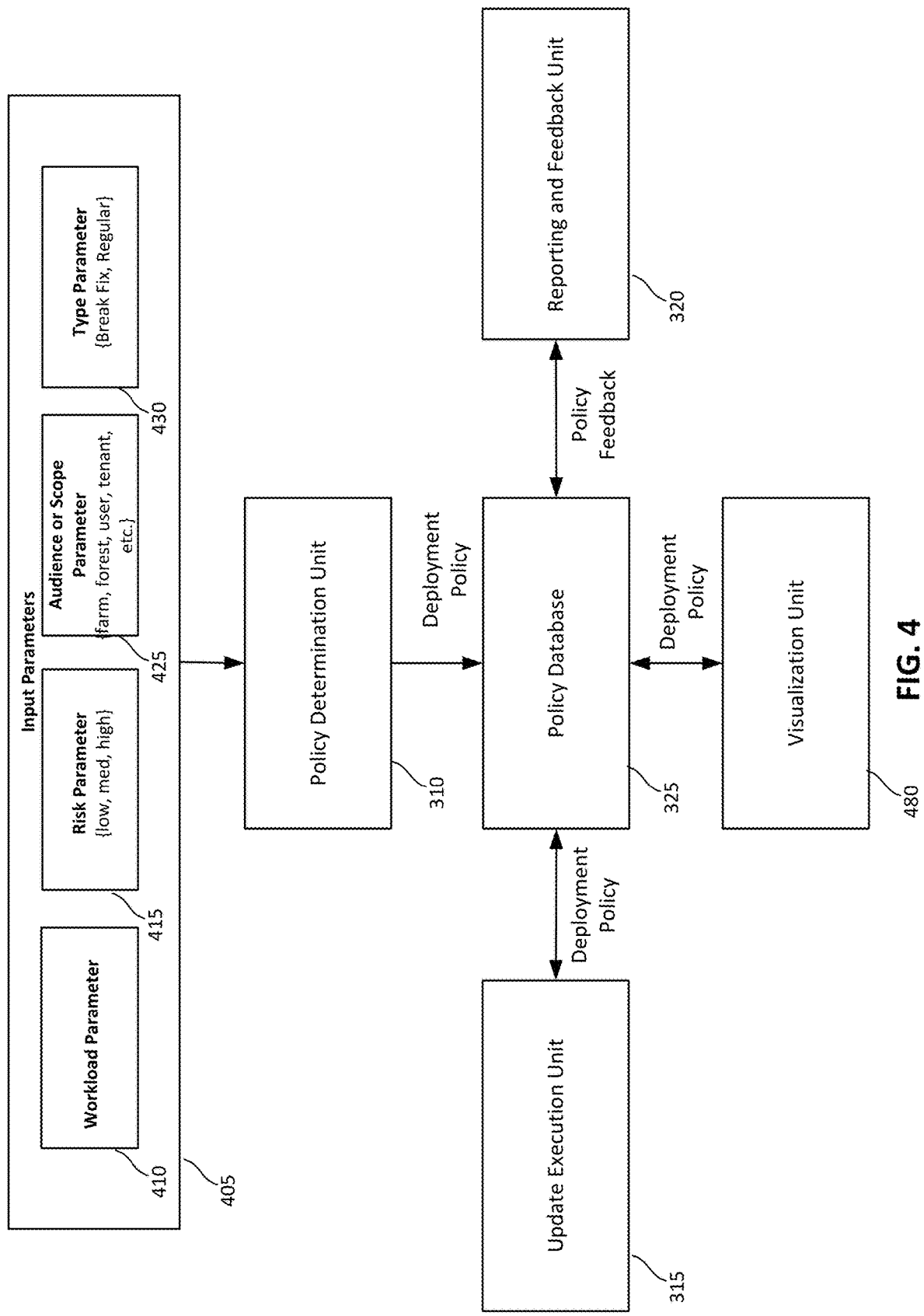
FIG. 4 is a diagram showing the cloud-based service shown in FIG. 3 generating and executing a deployment policy.

FIG. 4 is a diagram showing additional details of the cloud-based service shown in FIG. 3 generating and executing a deployment policy.

The policy determination unit 310 may be configured to receive input parameters 405 that may be analyzed to determine the deployment policy for the update. The policy determination unit 310 may provide a user interface that may be presented on the display of a computing device used by an administrator of the cloud-based service 110. In the example shown in FIG. 4, the input parameters 405 include a workload parameter 410, a risk parameter 415, an audience parameter 425, and a deployment type parameter 430. The workload parameter 410 represents the elements of the cloud-based service 110 that are to be updated by the deployment. The workload parameter 410 may identify an application or applications, a service or set of services, a configuration file, a data file, and/or a combination thereof to be updated by the deployment. The risk parameter 415 may include an indication of a risk level associated with the update. For example, the risk parameter 415 may indicate whether the update is low, medium, or high risk. Other implementations may include a numerical rating or other indication that represents a risk level associated with the update. The risk level may be determined based on a potential impact of the update on the customer base. A high-risk update may be associated with features used by many users and may significantly impact the ability of these users to utilize the services provided by the cloud-based service 110 if the updates do not operate as expected. A medium-risk update may impact fewer users than a high-risk update, may impact features that are used by fewer users, and/or may not as severely impact the ability of users to use the services provided by the cloud-based service 110. A low-risk update may impact few users and/or impact features that are infrequently used or would not impact the ability of most users to use the services provided by the cloud-based service 110.

The audience parameter 415 may identify the scope of the deployment. For example, the audience may identify a particular server farm, a domain, a forest (a logical grouping of one or more domains), a particular customer (also referred to as a tenant), a particular user or groups of users. The audience parameter 415 may be used to indicate that a particular deployment is not to be deployed across the entire userbase. Certain users or groups of users may receive a set of new features or custom features that are not deployed to the entire userbase of the cloud-based service 110. The policy determination unit 310 may use this information to determine how many users may be impacted by an update and to generate an appropriate number of rings and/or waves for the deployment to account for the size of the target audience.

The deployment type parameter 420 may be used to indicate whether the deployment is a regular deployment or a break fix deployment. Regular deployments may include new products and/or features that are being deployed to the userbase, while break fix deployments include fixes for features that are broken or operating incorrectly. Break fix deployments may be more urgent than regular deployments, as these deployments may be fixing problems with elements of the cloud-based service 110 that are negatively impacting the user experience and/or present a security issue that needs to be patched quickly to prevent malicious activity from exploiting a security hole. The policy determination unit 310 may prioritize the deployment of break fix updates over those associated with regular deployments due to the urgent nature of the break fix deployments. The number of rings and the bake time for each ring may be reduced for break fix deployments to ensure that the updates reach members of the userbase as quickly as possible.

The policy determination unit 310 may be configured to generate the deployment policies based on the input parameters 405 and predetermined ring definitions. As discussed in the preceding examples, the policy determination unit 310 may generate the deployment policies using a machine learning model trained to select a predetermined ring definition from a sets of predetermined ring definitions based on the input parameters 405. The machine learning model may also be trained on architectural information for the cloud-based service 110. The predetermined ring definitions may include a sequence of predetermined ring definitions that may be selected for deploying various types of updates. Each ring may be associated with a logical grouping of users for which an update is to be deployed and may also be associated with a time interval that indicates how long the update execution unit 315 should wait before proceeding to the next ring in the sequence. Each ring may also be associated with a logical grouping of components of the cloud-based service 110 that are associated with each ring. These components may be software and/or hardware components of the cloud-based service 110 to which the updates are to be deployed for that ring. This time interval is also referred to as "bake time" herein. The bake time allows for the reporting and feedback unit 320 to collect telemetry data and/or user feedback data and to analyze this data to determine whether the deployment should proceed to the next ring or be halted due to problems with the update.

To illustrate using predefined sets of rings, a first set of rings may be defined for low-risk updates and/or for lower usage features that may impact fewer customers if the update does not work as intended. The first set of rings may include fewer rings and a shorter time between the deployments associated with each ring. In contrast, a second set of rings may be defined for higher-risk updates and/or for features that may impact many customers if the update does not work as intended. The second set of rings may include more rings that the first set of rings, each ring may include fewer users, and the bake time associated with the rings may be longer. This approach provides a slower rollout of the updates so that any problems associated with the deployment impacts fewer customers. Furthermore, a ring may be further subdivided into multiple waves as shown in FIG. 2B.

The policy determination unit 310 may also be configured to dynamically generate ring definitions for a deployment policy rather than rely on predetermined ring definitions. The machine learning model used by the policy determination unit 310 may be configured to analyze the input parameters 405 and to generate a deployment policy that includes a set of rings and deployment schedule based on these input parameters 405. The machine learning model may be configured to generate a deployment policy that includes a greater number of rings for products and/or features that are used by a larger number of the userbase, where the risk is indicated to be higher, the audience is determined to be larger, and for break fixes. The deployment policy output by the policy determination unit 310 may then be stored in the policy database 325.

The update execution unit 315 may be configured to cause the deployment plan generated by the policy determination unit 310 to be executed. The deployment plan may indicate a start date and/or time for the deployment, and the update execution unit 315 may initiate the update according to this start date and time. The deployment plan may alternatively indicate that the policy determination unit 310 may immediately execute the deployment plan as soon as sufficient computing resources are available to initiate the deployment. The deployment plan may also indicate that a manual confirmation is required for some deployment plans, and an administrator of the cloud-based service 110.

The cloud-based service 110 implements the deployment according to the ring definitions and schedule provided in the deployment plan. The update execution unit 315 may be configured to transmit the payload associated with the update one or more components of the cloud-based service 110. The update execution unit 315 may be configured to initialize one or more update processes for implementing the update one the one or more components to be updated. These components may need to be temporarily taken offline during the update, and user traffic may be directed to other components of the cloud-based service 110 during the update process. The cloud-based service 110 may be configured to monitor the progress of the updates and to update the associated record or records in the policy database 325 associated with the deployment.

The reporting and feedback unit 320 may also be configured to provide a user interface that permits users to provide feedback regarding updates and for collecting telemetry data from components of the cloud-based service 110 and/or from client devices, such as the client devices 105a-105d shown in FIG. 1. The reporting and feedback unit 320 may be configured to analyze the telemetry data and/or user feedback information to determine whether there are problems associated with the deployment. The reporting and feedback unit 320 may generate reports that provides information about the current deployment states of the updates and the performance of the updates based on the telemetry data and/or user feedback. The reporting and feedback unit 320 may be configured to automatically trigger an alert that may be provided to one or more administrators and/or to perform one or more remedial actions in response to determining that the deployment is associated with issues that may require a response from administrators of the cloud-based service 110. The reporting and feedback unit 320 may also halt the deployment in response to detecting problems.

Figure 5:
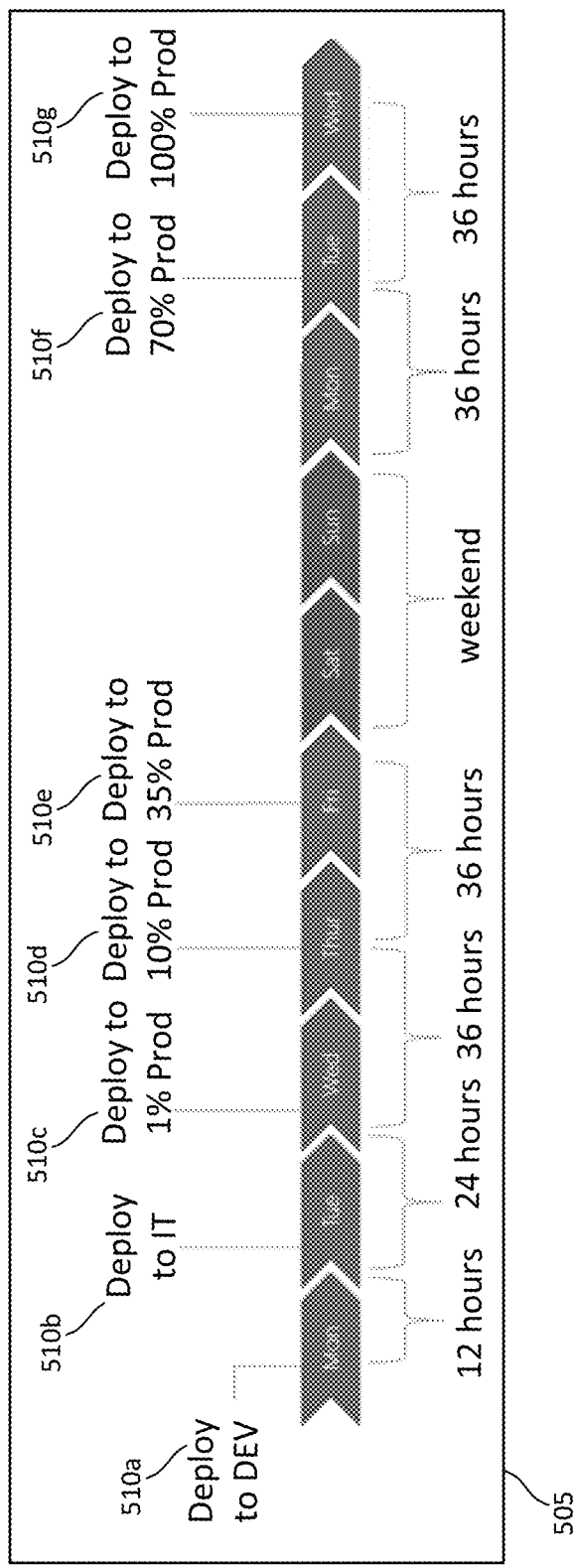
FIG. 5 is a diagram of an example deployment policy.

The visualization unit 480 may be configured to provide a means for generating a graphical representation of a deployment policy. An example of such a visualization is shown in FIG. 5. The visualization unit 480 may provide means for viewing the details of the deployment policy and may also include means for updating one or more parameters of the deployment policy.

FIG. 5 is a diagram showing a graphical representation 505 of a deployment policy. The deployment policy, once generated by the policy determination unit 310, may be stored as a record or set of records in the policy database 325. The visualization unit 480 may provide a user interface configured to provide means for a user to select a deployment policy from the deployment policies stored in the policy database 325, and the visualization unit may then generate and display a graphical representation of the selected deployment policy. The graphical representation of the deployment policy may be a static or dynamic representation of the deployment policy. A static representation of the deployment policy provides a read-only view of the deployment policy, while a dynamic representation of the deployment policy may provide user interface elements that permit the user to modify various parameters of the deployment policy and to save the modified deployment policy to the policy database 325.

The graphical representation 505 shown in FIG. 5 provides a timeline showing when the deployment of the updates is scheduled for each ring associated with the deployment schedule. In this example, there are seven rings: 510*a*, 510*b*, 510*c*, 510*d*, 510*e*, 510*f*, and 510*g*. The amount of time between the deployments associated with each of the rings is also shown. The amount of time between deployments may vary. The length of time between deployments may depend at least in part on the level of risk associated with the deployment, the number of users associated with the ring, whether the ring is associated with a production or non-production environment, and/or other factors. In the example deployment policy shown in FIG. 5, the bake time between the initial deployment of ring 510*a* and the deployment at ring 510*b* is 12 hours. This initial deployment is to a small group of developers, and this amount of time may be sufficient to collect enough telemetry data and/or user feedback to make determination that the updates appear to be operating correctly. Therefore, the second deployment associated with the second ring 510*b* may be deployed by the Information Technology (IT) group to users who are within the organization. The third deployment associated with ring 510*c* is scheduled for 24 hours after the second deployment to provide time to collect enough telemetry data and/or user feedback data to assess whether the updates appear to be operating correctly before deploying the updates to 1% of the production users. The interval between deployment is then increased to 36-hour intervals between deployments of the updates to the next ring. The deployments to the production users impact customers of the cloud-based service 110, and a longer interval between deployments provides more time to analyze the telemetry data and/or user feedback to identify problems that may negatively impact the user experience of customers before deploying the updates to more of the user.

The deployment plan in this example has also skipped the weekend days in the deployment schedule. The policy determination unit 310 may be configured to skip days that fall on weekends and/or holidays when determining the deployment policy for an update. The reason for this may be twofold. First, there may be fewer support staff available to help diagnose problems with an update and to help remediate any issues caused by the problems with the update. Second, fewer users, whether internal users or customers, may also be available to make use of the features that have been updated by the deployment. Therefore, the amount of telemetry data and/or user feedback received may be insufficient to assess whether the update deployed is operating as expected.

Figure 6:
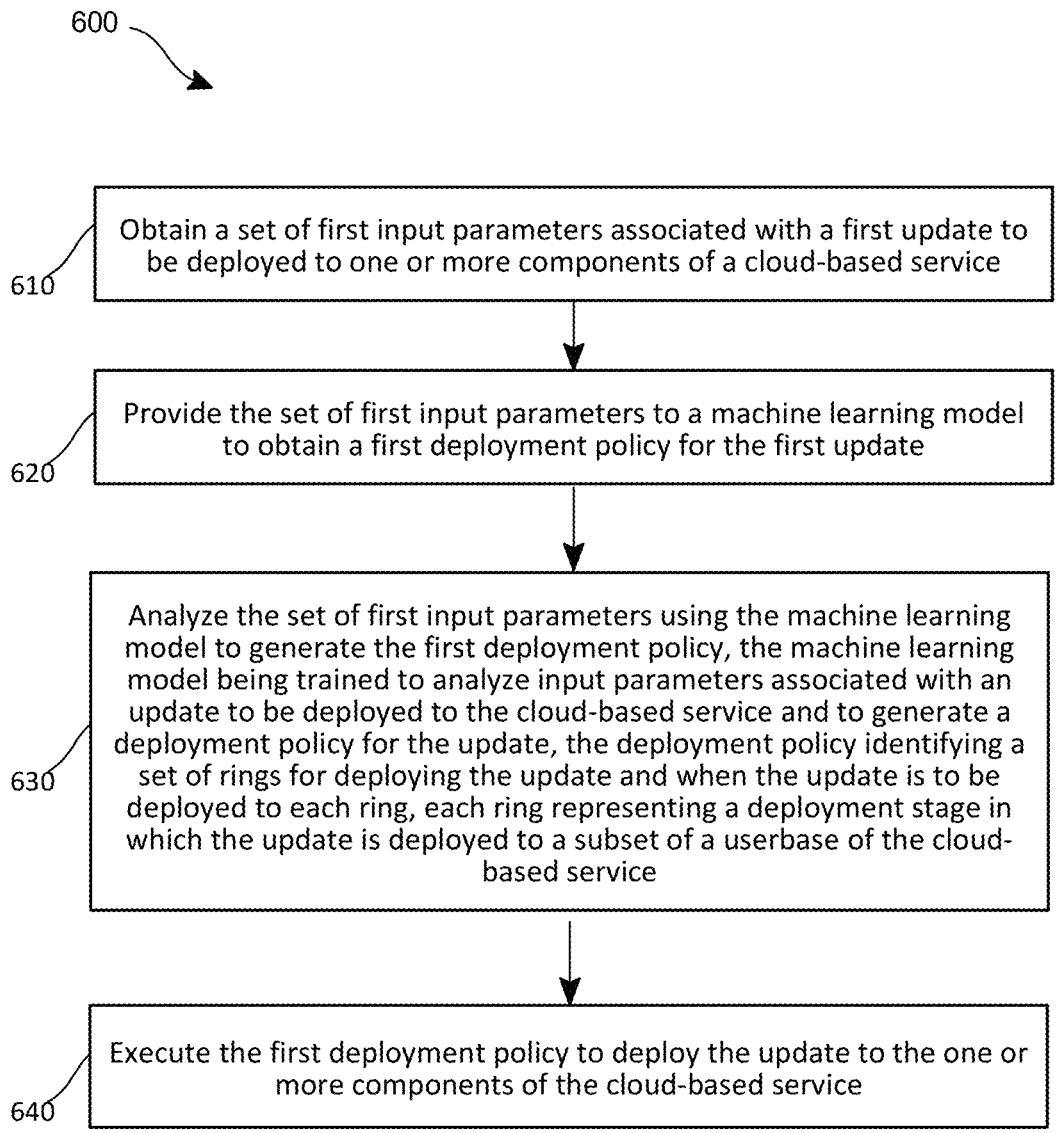
FIG. 6 is a flow diagram of a policy-based process for deploying updates to a cloud-based service.

FIG. 6 is a flow chart of an example process 600. The process 600 may be implemented by the cloud-based service 110. The process 600 may be used to generate and execute deployment policies for the cloud-based service 110. In some implementations, the process 600 may be implement by a deployment service that is separate from the cloud-based service 110.

The process 600 may include an operation 610 of obtaining a set of first input parameters associated with a first update to be deployed to one or more components of a cloud-based service. As discussed in the preceding example, the cloud-based service 110 may provide a user interface that enables an administrator to create a generate a new deployment policy for an update. The user interface may receive a set of input parameters that provide information that the cloud-based service 110 may analyze to generate the deployment policy.

The process 600 may include an operation 620 of providing the set of first input parameters to a machine learning model to obtain a first deployment policy for the first update, and an operation 630 of analyzing the set of first input parameters using the machine learning model to generate the first deployment policy. As discussed in the preceding examples, the policy determination unit 310 may utilize a machine learning model to determine the deployment policy for an update. The machine learning model is trained to analyze input parameters associated with an update to be deployed to the cloud-based service and to generate the deployment policy for the update. The deployment policy identifies a set of rings for deploying the update and when the update is to be deployed to each ring. Each ring represents a deployment stage in which the update is deployed to a subset of the userbase of the cloud-based service.

The process 600 may include an operation 640 of executing the first deployment policy to deploy the update to the one or more components of the cloud-based service. As discussed in the preceding examples, the update execution model 315 may be configured to execute the deployment according to the deployment policy that was generated by the policy determination unit 310 for the update.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
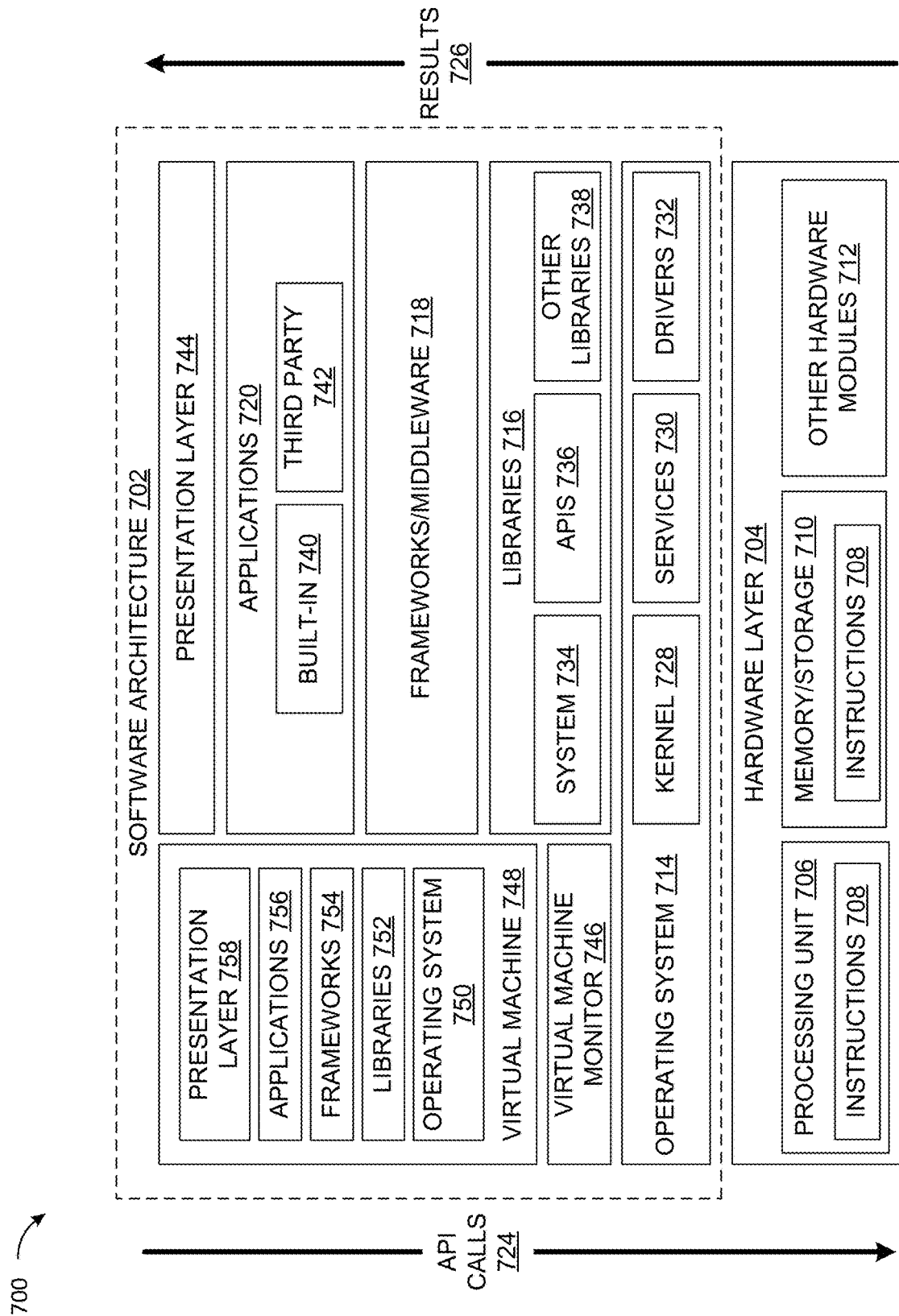
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
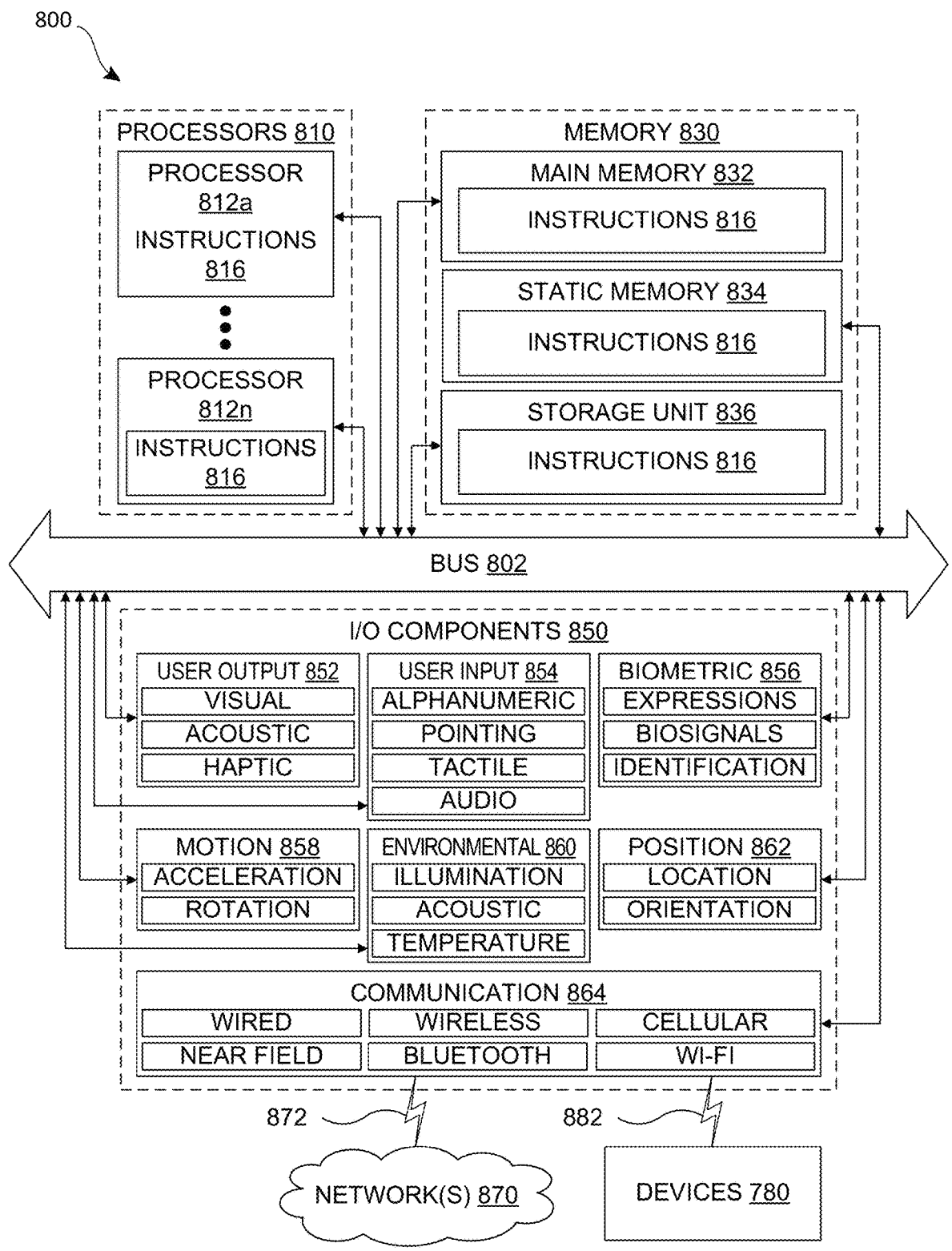
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
      obtaining a set of first input parameters associated with a first update to be deployed to one or more first components of a cloud-based service;
      providing the set of first input parameters to a machine learning model to obtain a first deployment policy for the first update;
      analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to each ring, each ring representing a deployment stage in which the update is deployed to a subset of a userbase of the cloud-based service; and
      executing the first deployment policy to deploy the update to the one or more first components of the cloud-based service.

2. The data processing system of claim 1, wherein the machine learning model is configured to select the set of rings from multiple sets of predetermined rings.

3. The data processing system of claim 1, wherein the machine learning model is configured to dynamically generate the set of rings based on the set of first input parameters and an architecture of the cloud-based service.

4. The data processing system of claim 1, wherein the input parameters include a risk parameter indicative of an amount of risk that the update may introduce problems, an audience parameter indicating users to which the update is to be deployed, and a type of update indicating whether the update includes a new feature or is to fix a problem with the one or more first components of the cloud-based service.

5. The data processing system of claim 1, wherein the machine-readable medium includes instructions configured to cause the processor to perform operations of:
   obtaining a set of second input parameters associated with a second update to be deployed to one or more second components of the cloud-based service;
   providing the set of first input parameters to a machine learning model to obtain a second deployment policy for the first update;
   analyzing the set of second input parameters using the machine learning model to generate the second deployment policy, wherein the second deployment policy is different from the first deployment policy; and
   executing the second deployment policy to deploy the update to the one or more second components of the cloud-based service.

6. The data processing system of claim 1, wherein the machine-readable medium includes instructions configured to cause the processor to perform operations of:
   monitoring deployment of the first update to each ring of the set of rings;
   detecting a problem with the first update based on data collected while monitoring the deployment;
   halting the deployment of the first update responsive to detecting the problem; and
   performing one or more remedial actions to correct the problem with the first update.

7. The data processing system of claim 6, wherein the machine-readable medium includes instructions configured to cause the processor to perform operations of:
   updating the machine learning model based on the data collected while monitoring the deployment.

8. A method implemented in a data processing system for deploying updates to a cloud-based service, the method comprising:
   obtaining a set of first input parameters associated with a first update to be deployed to one or more components of the cloud-based service;

providing the set of first input parameters to a machine learning model to obtain a first deployment policy for the first update;

analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update and when the update is to be deployed to each ring, each ring representing a deployment stage in which the update is deployed to a subset of a user base of the cloud-based service; and executing the first deployment policy to deploy the update to the one or more components of the cloud-based service.

9. The method of claim 8, wherein the machine learning model is configured to select the set of rings from multiple sets of predetermined rings.

10. The method of claim 8, wherein the machine learning model is configured to dynamically generate the set of rings based on the set of first input parameters and an architecture of the cloud-based service.

11. The method of claim 8, wherein the input parameters include a risk parameter indicative of an amount of risk that the update may introduce problems, an audience parameter indicating users to which the update is to be deployed, and a type of update indicating whether the update includes a new feature or is to fix a problem with the one or more components of the cloud-based service.

12. The method of claim 8, further comprising:
obtaining a set of second input parameters associated with a second update to be deployed to one or more second components of the cloud-based service;
providing the set of first input parameters to a machine learning model to obtain a second deployment policy for the first update;
analyzing the set of second input parameters using the machine learning model to generate the second deployment policy, wherein the second deployment policy is different from the first deployment policy; and
executing the second deployment policy to deploy the update to the one or more second components of the cloud-based service.

13. The method of claim 8, further comprising:
monitoring deployment of the first update to each ring of the set of rings;
detecting a problem with the first update based on data collected while monitoring the deployment;
halting the deployment of the first update responsive to detecting the problem; and
performing one or more remedial actions to correct the problem with the first update.

14. The method of claim 13, further comprising:
updating the machine learning model based on the data collected while monitoring the deployment.

15. A machine-readable medium on which are stored instructions that, when executed, cause a processor of a programmable device to perform operations of:

obtaining a set of first input parameters associated with a first update to be deployed to one or more components of a cloud-based service;
providing the set of first input parameters to a machine learning model to obtain a first deployment policy for the first update;
analyzing the set of first input parameters using the machine learning model to generate the first deployment policy, the machine learning model being trained to analyze input parameters associated with an update to be deployed to the cloud-based service and to generate a deployment policy for the update, the deployment policy identifying a set of rings for deploying the update, and when the update is to be deployed to each ring, each ring representing a deployment stage in which the update is deployed to a subset of a userbase of the cloud-based service; and
executing the first deployment policy to deploy the update to the one or more components of the cloud-based service.

16. The machine-readable medium of claim 15, wherein the machine learning model is configured to select the set of rings from multiple sets of predetermined rings.

17. The machine-readable medium of claim 15, wherein the machine learning model is configured to dynamically generate the set of rings based on the set of first input parameters and an architecture of the cloud-based service.

18. The machine-readable medium of claim 15, wherein the input parameters include a risk parameter indicative of an amount of risk that the update may introduce problems, an audience parameter indicating users to which the update is to be deployed, and a type of update indicating whether the update includes a new feature or is to fix a problem with the one or more components of the cloud-based service.

19. The machine-readable medium of claim 15, further comprising instructions configured to cause the processor to perform operations of:
obtaining a set of second input parameters associated with a second update to be deployed to one or more second components of the cloud-based service;
providing the set of first input parameters to a machine learning model to obtain a second deployment policy for the first update;
analyzing the set of second input parameters using the machine learning model to generate the second deployment policy, wherein the second deployment policy is different from the first deployment policy; and
executing the second deployment policy to deploy the update to the one or more second components of the cloud-based service.

20. The machine-readable medium of claim 15, further comprising instructions configured to cause the processor to perform operations of:
monitoring deployment of the first update to each ring of the set of rings;
detecting a problem with the first update based on data collected while monitoring the deployment;
halting the deployment of the first update responsive to detecting the problem; and
performing one or more remedial actions to correct the problem with the first update.

* * * * *